3,427,344
PROCESS FOR THE MANUFACTURE OF UNSATURATED CARBOXYLIC ACID ESTERS
Jiro Tsuji, 937–1 Koshigoe, Kamakura-shi, Kanagawa-ken, Japan, and Jitsuo Kiji, Masanobu Morikawa, and Shinzo Imamura, all of 660–1, Aza Mine, Tebiro, Kamakura-shi, Kanagawa-ken, Japan
No Drawing. Filed Mar. 16, 1964, Ser. No. 352,294
Claims priority, application Japan, July 29, 1963, 38/37,730
U.S. Cl. 260—468    9 Claims
Int. Cl. C07c 67/00, 69/52; C07b 29/06

This invention relates to the manufacture of unsaturated carboxylic acid esters by the reaction of allylic compounds with carbon monoxide. It relates, more specifically, to the manufacture of $\beta,\gamma$-unsaturated carboxylic acid esters by causing allylic compounds, carbon monoxide and cyclic ether to react using noble metals of Group VII or VIII in the Periodic Table or compounds containing the said noble metals as catalysts. The allylic compounds used in the process of this invention are compounds having a group of the structure —CH=C—C=Hal where Hal signifies halogen or

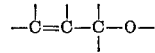

as the main part of the molecule, namely a group consisting of allyl radical and halogen or oxygen bonded therewith, and the said allyl radical can be unsubstituted or can be substituted by hydrocarbon radical.

Also, the above-mentioned allylic compound can be represented by the general formula A—X. A in such formula is an allylic group

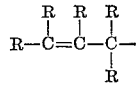

where R is a substituent selected from the hydrogen or the same or different alkyl radicals, and the $\alpha$- and $\gamma$-carbon atoms in the said allylic group being able to form a ring through at least one carbon atom, and X is a substituent selected from among halogen atoms and groups of the formula

—OY where Y is hydrogen, alkyl, aryl or an organic acid residue.

Though the number of carbon atoms in the above-mentioned substituted or non-substituted allyl group is not limited particularly, those which comprise 3–20, especially 3–6 carbon atoms are used preferably.

By allylic compounds are meant, more in detail, allylic alcohols, allylic halides, allylic ethers and organic acid esters of allylic alcohols. As the functional group in these compounds, the hydroxyl group or halogen-containing groups, namely allylic alcohol or allylic halide, is used particularly preferably in the process of the present invention. Specific examples of allylic compounds of the allylic alcohol class are illustrated as follows: allyl alcohol, 2-methylallyl alcohol (i.e. methallyl alcohol), 2-buten-1-ol (i.e. crotyl alcohol), 1-penten-3-ol, 2-penten-1-ol, 3-penten-2-ol, 2-hexen-1-ol, 1-hexen-3-ol, 2-hexen-4-ol, 3-hexen-2-ol, 2-hepten-1-ol, 2-octen-1-ol, 2-decen-1-ol, 2-dodecen-1-ol, 2-hexadecen-1-ol, 2-octadecen-1-ol, 2-cyclohexen-1-ol, etc. Specific examples of ether groups bonded to the allylic group, are as follows: methyl ether (i.e. a concrete example of allylic compound in this case is allyl methyl ether), ethyl ether, propyl ether, hexyl ether, octyl ether, dodecyl ether, octadecyl ether, allyl ether, phenyl ether, etc. Specific examples of ester groups are as follows: acetic acid ester, propionic acid ester, caproic acid ester, capric acid ester, stearic acid ester, palmitic acid ester, benzoic acid ester, p-toluene-sulfonic acid ester, etc.

The catalyst in the present invention is used as a simple substance or as a compound of noble metals of Group VII or VIII namely, rhenium, palladium, rhodium, ruthenium, osmium, iridium and platinum. The said compounds, giving representative examples such as oxides, carbonyl compounds and salts, are illustrated as follows: the oxides are, for example, palladium oxide, rhenium oxide, ruthenium oxide, etc., these oxides of noble metals, however, are not limited as to the particular oxidized state, and they can be in any oxidized state, for example, monoxide and dioxide of palladium, and dioxides and tetroxide of ruthenium.

When these noble metals are used as carbonyl compounds, those used especially preferably are as follows: palladium carbonyl halide, platinum carbonyl halide, rhodium carbonyl halide, ruthenium carbonyl halide, rhodium carbonyl, platinum carbonyl, etc. As salts of noble metals, halide compounds, nitrate salts and complex salts are preferable, for example, palladium chloride, palladium bromide, palladium iodide, palladium nitrate, rhodium chloride, rhenium chloride, platinum chloride, platino- and platinichloride, butadiene-palladium chloride complex, benzonitrile-palladium chloride complex, palladium acetyl-acetonate, etc. Of these catalysts, palladium halide and rhodium halide are particularly preferable. These catalysts may be used singly or in admixture of two or more, and also, they may be used in powder state as they are or with the use of carriers such as, for example, charcoal, asbestos, silica-gel, barium sulfate, etc.

Concerning the process of carrying out the present invention, any one is sufficient which brings the reactants into contact with each other, and it is readily possible to produce in high yields a $\beta,\gamma$-unsaturated carboxylic acid ester having one carbon more than the original allylic type compound.

Concerning the amount of catalyst used, more than 0.00001 molar equivalent weight to the allylic compound, which is a starting material, is sufficient. Particularly preferable results are obtained when 0.01–0.5 molar equivalent weight thereof is used. These catalysts are, in general, recovered as noble metals after the reaction, and can be regenerated and used again.

Though carbon monoxide reacts at atmospheric pressure, in order to obtain advantageous reaction velocity, it is preferable to force it to react at a pressure higher than 10 kg./cm.$^2$, particularly at 50–300 kg./cm.$^2$. In this case, another inert gas may also coexist.

Concerning reaction temperature, a range from room temperature to 500° C. is available, however, it is preferable to heat from 50° C. to 300° C. in order to suppress subsidiary reactions and obtain moderate reaction velocity.

Concerning the processes of realizing the present invention, these comprise, for example, one in which, after the salt of noble metal of Group VII or VIII corresponding to the catalytic amount is dispersed in alcohol, allyl type compound is added thereto, and these are contacted with carbon monoxide by shaking, stirring or bubbling, etc., or one in which the reaction is performed in vapor phase with the use of catalyst held on a carrier, and etc. More preferable results, however, are obtained in general when the reaction is performed in liquid phase.

The liquid phase reaction proceeds smoothly in an appropriate solvent medium. Excess allylic compound can be used as the reaction medium, as can also a conventional organic solvent such as benzene, ether, etc.

As explained above, according to the present invention, it is possible to produce a β,γ-unsaturated carboxylic acid ester which has a carboxylic acid radical containing one more carbon atom than that of the starting allylic compound, under milder conditions, more safely and in higher yields than any of the customary processes as for example that wherein extremely dangerous nickel carbonyl is used.

According to the process of the present invention, the major part of the products is β,γ-unsaturated carboxylic acid ester. In such reaction, however, we recognized that, when allylic halide and alcohol are used as starting materials, it has a tendency that a part of generated hydrogen halide accumulates in the reaction system as the reaction proceeds, this causing an isomerization of double bond, producing some α,β-unsaturated carboxylic acid ester, and concomitantly a small amount of saturated carboxylic acid ester. After further investigation on these points, the present inventors found that, when a cyclic ether was used instead of the alcohol above-mentioned, β,γ-unsaturated carboxylic acid ester is selectively obtained without causing any concurrent reaction above-mentioned, and moreover, with markedly high yields. When a cyclic ether is used, only a β,γ-unsaturated carboxylic acid ester is obtained without producing hydrogen halide. This ester has an —OH group in the halohydrin produced by the ring opening reaction of the cyclic ether with hydrogen halide reacts as an alcoholic —OH with allylic halide, or a β,γ-unsaturated carboxylic acid ester of halohydrin.

Cyclic ethers are the compounds illustrated by the general formula

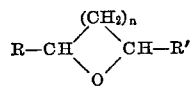

(where $n$ is 0, 1, 2 or 3, R and R' are hydrogen, alkyl radical or substituted alkyl radical), and specific examples are as follows: ethylene oxide, trimethylene oxide, tetrahydrofuran, tetrahydropyran, propylene oxide, etc. However, the compounds such as epihalohydrin having substituted alkyl radical in the general formula above-mentioned are also available, or in other words, the compounds generally called 1,2-, 1,3-, 1,4-, or 1,5-epoxide are used. Among these cyclic ethers, the most preferably used one is tetrahydrofuran.

In the process of the present invention, when allyl chloride as an allylic type halide and tetrahydrofuran as a cyclic ether are used, the reaction is illustrated by the following equation:

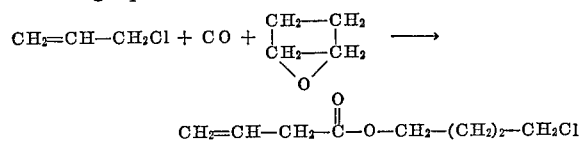

Though the reactants react with each other in an equivalent molar ratio and the relative amount thereof is decided principally by economical conditions of the reaction, if it is desired to increase the reaction yields based on allylic type halide, the excess use of carbon monoxide, of course, and the excess use of cyclic ether from the stoichiometric amount up to about 30 molar equivalent weight would be advantageous. The excess cyclic ether, in this case, can be a reaction medium and, therefore, it is unnecessary to add any other medium particularly. However, depending upon the relative amount thereof, it may be allowed to add inert solvent such as benzene, hexane and cyclohexane as a medium.

Thus for example, vinylacetic acid ester of 4-chloro-n-butanol-1 is obtained extremely easily from allyl chloride, carbon monoxide and tetrahydrofuran, and similarly, isopropenylacetic acid ester of 4-chloro-n-butanol-1 from methallyl chloride. These esters can be easily transformed to ethylester or methylester, leaving chlorohydrin, etc. as occasion demands.

And moreover, it is advantageous that in the case of 4-chloro-n-butanol-1, tetrahydrofuran is easily recovered liberating hydrogen halide.

EXAMPLE 1

After 40 g. of tetrahydrofuran, 15 g. of allyl chloride and 1.8 g. of palladium chloride were charged in a 100 cc. stainless steel autoclave equipped with electromagnetic stirrer, carbon monoxide was forced thereinto until a pressure of 120 kg./cm.$^2$ was reached. The content was heated to 80° C. and stirring was continued for 10 hours. Pressure drop of about 100 kg./cm.$^2$ was found. The content was distilled after filtration of the precipitate therein, whereupon 24 g. of distillate having a boiling point of 108–112° C./13 mm. Hg was obtained. It was found that this was composed of a single component by gas-chromatography. It was recognized that this was 4-chloro-n-butyl vinylacetate from the results of NMR—, IR spectrum, elementary analysis, ester interchange, etc. The yield was 70%.

EXAMPLE 2

In a 100 cc. autoclave, allyl chloride and carbon monoxide were allowed to react at 120° C. for 6 hours in an excess tetrahydrofuran in the presence of palladium chloride. The yield of 4-chloro-n-butyl vinylacetate was 65%.

EXAMPLE 3

After 20 cc. of benzene, 5 g. of allyl chloride, 5 g. of tetrahydrofuran and 0.9 g. of palladium chloride were charged in a 50 cc. stainless steel autoclave equipped with electromagnetic stirrer, carbon monoxide was forced thereinto until a pressure of 100 kg./cm.$^2$ was reached. The reaction was carried out at 80° C. The pressure of carbon monoxide was maintained above 80 kg./cm.$^2$ by recharges, and stirring was continued for 8 hours. Then 10.2 g. of 4-chloro-n-butyl vinylacetate was obtained. The yield was 88%. When the reaction was performed under the same conditions as before but adding 30 g. of ethanol instead of tetrahydrofuran and benzene, ethyl vinylacetate was produced in 49% yield, accompanied by ethyl crotonate in 4% yield.

EXAMPLE 4

In a 100 cc. stainless steel autoclave equipped with electromagnetic stirrer, 40 g. of tetrahydrofuran, 15 g. of allyl chloride and 2.0 g. of rhodium chloride were charged, then carbon monoxide was forced thereinto until a pressure of 100 kg./cm.$^2$ was reached. The reaction was carried out at 100° C. for 10 hours. The yield of 4-chloro-n-butyl vinylacetate was 60%.

EXAMPLE 5

In a 100 cc. stainless steel autoclave equipped with electromagnetic stirrer, 50 cc. of tetrahydrofuran, 18 g. of methallyl chloride and 3 g. of palladium chloride were charged, then carbon monoxide was forced thereinto until a pressure of 100 kg./cm.$^2$ was reached. The reaction was continued at 80° C. for 7 hours. Almost all carbon monoxide was absorbed. The content was distilled after being filtered off, whereupon 23.2 g. of distillate having a boiling point of 81–83° C./3 mm. Hg was obtained. It was recognized that this was 4-chloro-n-butyl isopropenylacetate by NMR— and IR spectra. By gaschromatography, it was found that the amount of isomer whose double bond migrated was negligibly small. The yield was 61%.

EXAMPLE 6

In a 100 cc. stainless steel autoclave equipped with electromagnetic stirrer, 30 cc. of benzene, 1.8 g. of palladium chloride, 7.6 g. of allyl chloride and 5.9 g. of propylene oxide were charged, then carbon monoxide was forced thereinto until a pressure of 100 kg./cm.$^2$ was reached. The reaction was carried out at 100–105° C. for 7 hours. After the reaction, the content was distilled and 9.9 g. of distillate having a boiling point of 93–96° C./31 mm. Hg was obtained. It was recognized that the distillate was mixed esters of vinylacetic acid and propylene chlorohydrin by NMR spectra.

EXAMPLE 7

In a 100 cc. glass vessel with gas inlet capillary, 15 g. of allyl chloride, 33 cc. of tetrahydrofuran and 1.2 g. of rhodium oxide which is well-known as the Adams type hydrogenation catalyst were charged. The vessel was placed in a 300 cc. autoclave, then carbon monoxide was forced thereinto until a pressure of 100 kg./cm.$^2$ was reached. The autoclave was heated to 100° C. and shaken for 10 hours. The yield of 4-chloro-n-butyl vinylacetate was 65%.

EXAMPLE 8

Similarly as in the reaction in Example 25, 15 g. of allyl bromide, 33 cc. of tetrahydrofuran and 0.2 g. of Adams type platinum-rhodium (1:3) catalyst were charged in a glass vessel. This vessel was further placed into a 300 cc. autoclave, then carbon monoxide was forced thereinto until a pressure of 100 kg./cm.$^2$ was reached. The autoclave was heated to 100° C. and shaken for 10 hours. The yield of 4-bromo-n-butyl vinylacetate was 17%.

EXAMPLE 9

Seven point six grams of allyl chloride, 20 g. of tetrahydrofuran and 1 g. of palladium acetylacetonate were charged in a glass vessel. This vessel was further placed into a 300 cc. autoclave, then carbon monoxide was forced thereinto until a pressure of 100 kg./cm.$^2$ was reached. The autoclave was heated to 80° C. and shaken for 10 hours. The yield of 4-chloro-n-butyl vinylacetate was 73%.

EXAMPLE 10

Four grams of methallyl chloride, 10 cc. of tetrahydrofuran and 0.5 g. of paladium black were charged in a 50 cc. glass vessel. This vessel was further placed into a 100 cc. autoclave, then carbon monoxide was forced thereinto until a pressure of 100 kg./cm.$^2$ was reached. The autoclave was shaken at 100° C. for 15 hours. The yield of 4-chloro-n-butyl isopropenylacetate was 53%.

EXAMPLE 11

After 40 g. of cyclohexane was dissolved in 100 cc. of carbon tetrachloride, 17 g. of N-bromosuccinimide was added. The mixture was heated to reflux, and 3-bromocyclohexene-1 was synthesized. After filtering the precipilate off, the whole filtrate was concentrated to 28 g. To this, 50 cc. of tetrahydrofuran and 1.8 g. of palladium chloride were added. The suspension thus prepared was charged in a 100 cc. autoclave equipped with electromagnetic stirrer, then carbon monoxide was forced thereinto until a pressure of 100 kg./cm.$^2$ was reached. The autoclave was shaken at 100° C. for 10 hours.

After completion of reaction, filtering the precipitate off, 14.6 g. of distillate having a boiling point of 100–115° C./mm. Hg was obtained. This was dissolved in 50 cc. ethanol, several drops of concentrated sulfuric acid added, the ethyl ester being obtained by ester exchange. This was further reduced with palladium on carbon, whereupon 5.2 g. of ethyl cyclohexancarboxylate was obtained.

EXAMPLE 12

Ten grams of allyl chloride, 20 g. of tetrahydrofuran and 1 g. of rhenium pentachloride were charged in a glass vessel. This vessel was placed in a 300 cc. autoclave, and carbon monoxide was forced thereinto until a pressure of 140 kg./cm.$^2$ was reached. The autoclave was heated to 100° C. and shaken for 12 hours, whereupon crude 4-chloro-n-butyl vinylacetate was obtained in 3.1% yield.

EXAMPLE 13

In a 100 cc. stainless steel autoclave, 30 cc. of tetrahydrofuran, 9 g. of 1-chloro-n-octen-2 chloride and 2.0 g. of palladium chloride were charged, then carbon monoxide was forced thereinto until a pressure of 120 kg./cm.$^2$ was reached. The reaction was carried out at 110° C. for 12 hours. The yield of 4-chloro-n-butyl n-butylacetate was 65%.

We claim:

1. A process for the preparation of $\beta,\gamma$- unsaturated carboxylic acid ester, wherein an allylic compound of the formula

wherein A is an allylic group of the formula

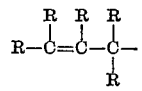

R is a substituent selected from the group consisting of hydrogen and alkyl, the $\alpha$-carbon atom and $\gamma$-carbon atom in the said allylic group being able to form a ring through at least one carbon atom, the total number of carbon atoms in the R substituents ranging from 3 to 6, and X is halogen, is reacted with carbon monoxide and a cyclic ether of the formula

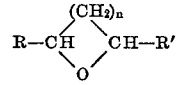

wherein $n=0$ to 3 inclusive and R and R' are hydrogen, alkyl or haloalkyl, in the presence of at least one noble metal catalyst selected from Group VII and Group VIII at a temperature of 50–300° C. and a pressure of 50–300 kg./cm.$^2$.

2. A process as claimed in claim 1, wherein the cyclic ether is tetrahydrofuran or propylene oxide.

3. A process as claimed in claim 1, wherein the allylic compound is allyl halide.

4. A process as claimed in claim 1, wherein the allylic compound is methallyl halide.

5. A process as claimed in claim 1, wherein the allylic compound is crotyl halide.

6. A process as claimed in claim 1, wherein the allylic compound is 3-halogen-cyclohexene.

7. A process as claimed in claim 1, wherein the allylic compound is 1-chloro-n-octene-2.

8. A process as claimed in claim 1, wherein the cyclic ether is tetrahydrofuran.

9. A process as claimed in claim 1, wherein the noble metal carbonylation catalyst is palladium carbonylation catalyst.

References Cited

UNITED STATES PATENTS

| | | | |
|---|---|---|---|
| 2,871,262 | 1/1959 | Benson | 260—486 |
| 3,009,947 | 11/1961 | Baron et al. | 260—486 |
| 3,040,090 | 6/1962 | Alderson et al. | 260—486 XR |
| 3,119,861 | 1/1964 | Blackham | 260—544 |
| 3,309,403 | 3/1967 | Mador et al. | 260—544 |

FOREIGN PATENTS

| | | |
|---|---|---|
| 1,138,760 | 1962 | Germany. |

(Other references on following page)

OTHER REFERENCES

Fisher et al.: "Zeitschrift fur Naturforschung," vol. 17B (1962) pp. 484–485, 23–24.

Chiusoli et al.: "Zeitschrift fur Naturforschung," vol. 17B (1962) p. 850.

Heck: J. Am. Chem. Soc., vol. 85 (1963) pp. 2013–2014.

Dehm et al.: J. Am. Chem. Soc., vol. 82 (August 1960) pp. 4429–4430.

Chiusoli et al.: (II), Chim Ind. (Milan) vol. 45 (1963) pp. 6–9.

Tsuji et al.: Part VIII, J. Am. Chem. Soc., vol. 86 (October 1964) pp. 4350–4353.

LORRAINE A. WEINBERGER, *Primary Examiner.*

ALBERT P. HALLUM, *Assistant Examiner.*

U.S. Cl. X.R.

260—486, 497, 491, 410.9

UNITED STATES PATENT OFFICE
CERTIFICATE OF CORRECTION

Patent No. 3,427,344 February 11, 1969

Jiro Tsuji et al.

It is certified that error appears in the above identified patent and that said Letters Patent are hereby corrected as shown below:

In the heading to the printed specification, line 4, beginning with "Jiro Tsuji, 937-1" cancel all to and includi "Japan", in line 7 and insert -- Jiro Tsuji, Jitsuo Kiji, Masanobu Morikawa and Shinzo Imamura, of Kamakura-shi, Kanagawa-ken, Japan, assignors to Toyo Rayon Kabushiki Kaisha, Tokyo, Japan, a corporation of Japan --.

Signed and sealed this 23rd day of June 1970.

(SEAL)
Attest:

Edward M. Fletcher, Jr.

Attesting Officer

WILLIAM E. SCHUYLER, JR.

Commissioner of Patents